United States Patent
Osborn, Jr.

(10) Patent No.: US 7,379,969 B2
(45) Date of Patent: May 27, 2008

(54) METHOD AND APPARATUS FOR PROVIDING INSTRUCTIONAL CONTENT ON A MOBILE DEVICE

(75) Inventor: Roger J. Osborn, Jr., Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 689 days.

(21) Appl. No.: 10/739,611

(22) Filed: Dec. 18, 2003

(65) Prior Publication Data

US 2005/0159141 A1 Jul. 21, 2005

(51) Int. Cl.
*G06F 15/16* (2006.01)
*H04Q 7/20* (2006.01)

(52) U.S. Cl. .............. 709/205; 455/456.1; 455/457; 455/466

(58) Field of Classification Search ............. 709/205; 455/456.1, 457, 466
See application file for complete search history.

(56) References Cited

U.S. PATENT DOCUMENTS

| | | | |
|---|---|---|---|
| 5,842,124 A | 11/1998 | Kenagy et al. | |
| 7,127,679 B2* | 10/2006 | Cohen | 715/744 |
| 2002/0119793 A1* | 8/2002 | Hronek et al. | 455/466 |
| 2003/0007012 A1* | 1/2003 | Bate | 345/825 |
| 2003/0100301 A1 | 5/2003 | Fujii | |
| 2004/0077360 A1* | 4/2004 | Engstrom et al. | 455/456.1 |
| 2004/0216036 A1* | 10/2004 | Chu et al. | 715/501.1 |
| 2004/0255271 A1* | 12/2004 | Lim | 717/110 |
| 2005/0044577 A1* | 2/2005 | Jerding et al. | 725/135 |
| 2006/0107227 A1* | 5/2006 | Kiljander | 715/772 |

FOREIGN PATENT DOCUMENTS

WO    WO 98/17045    4/1998

OTHER PUBLICATIONS

Sony Ericsson Mobile Communications AB, International Application No. PCT/US2004/026542, Written Opinion, Apr. 15, 2005.
Sony Ericsson Mobile Communications AB, International Application No. PCT/US2004/026542, International Search Report, Apr. 15, 2005.

* cited by examiner

*Primary Examiner*—Krisna Lim
(74) *Attorney, Agent, or Firm*—Frederick D. Bailey; Charles L. Evans; Moore & Van Allen, PLLC

(57) ABSTRACT

The present invention is directed to a method and apparatus for providing instructional content on a mobile device. In the example embodiment, the instructional content can be stored on the mobile device or it can be downloaded from a remote server. The mobile device provides the user with a list of instructional topics. After selecting a topic, the user is provided with step-by-step instructions designed to assist the user to accomplish a particular task. As the user performs each step, feedback is provided by the mobile device to help facilitate the successful completion of the task.

37 Claims, 8 Drawing Sheets

METHOD AND APPARATUS FOR PROVIDING INSTRUCTIONAL CONTENT ON A MOBILE DEVICE

BACKGROUND

Wireless communication devices have become commonplace in society. The complexity of these devices has increased and many of the device's sophisticated features remain unused due to either the user being unaware that the features exist or the user simply not knowing how to use them.

Historically, the primary method used to learn about a device is by using a user's guide printed on paper. Paper user's guides are often bulky and can be expensive to produce and distribute. User's guides can also become obsolete if the software in the device is updated. Instructions regarding how to use a device are often provided in the user's guide in the form of a static list of steps to follow in order to accomplish a particular task. The user must keep track of the step they are on and which steps they have already performed. The user must also keep the user's guide available or memorize the instructions for future use. User's guides do not provide feedback to the user to confirm that the user has actually performed the step indicated. If the user makes a mistake, they may not realize it until they have completed all of the steps and the expected result is not obtained.

SUMMARY

The present invention is directed to a method and apparatus for providing instructional content on a mobile device. In the example embodiments, the user of the mobile device is provided with a list of instructional topics concerning how to accomplish various tasks. After selecting one of the topics, one or more steps that are designed to assist the user to accomplish a particular task are executed by the mobile device. Each step may include one or more actions that should be successfully completed in order to complete the task. As each step is executed, the mobile device provides the user with feedback to facilitate the successful completion of the required actions.

In some embodiments, a server can provide instructional content to a mobile device. The server may include a data repository for storing instructional topics and a network interface for communicating with the mobile device. The network interface is used to provide instructional topics to the mobile device. The mobile device with which the server communicates may include a user interface for receiving input from the user and for providing information to the user. The mobile device may also include a processing platform connected to the user interface that enables a user to select an instructional topic regarding a particular task the user is trying to accomplish. After selecting a topic, the user is provided with step-by-step instructions designed to assist the user to accomplish the task. As the user performs each step, feedback is provided by the mobile device to help facilitate the successful completion of the task.

DESCRIPTION OF THE INVENTION

Figure 1:
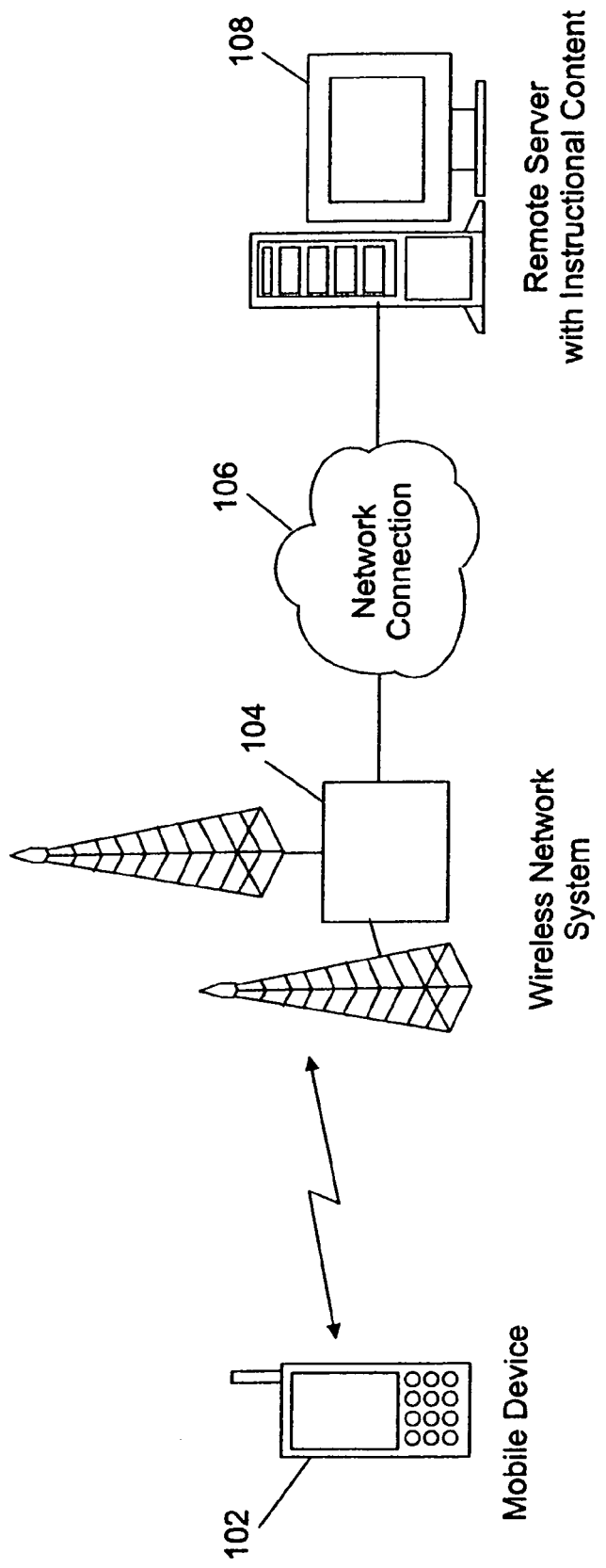
FIG. 1 is an example of a typical configuration of a mobile device and a remote server in accordance with one embodiment of the present invention.

It is to be understood that the present invention is not limited to the example embodiments disclosed herein. FIG. 1 provides an example of a typical configuration of the present invention in accordance with one embodiment that includes a mobile device 102, a wireless network system 104, a network connection 106, and a remote server 108. The mobile device 102 may be any type of communications device capable of transmitting and receiving signals over a wireless network system 104. This may include traditional devices such as cellular telephones, personal communications systems, personal data assistants, conventional laptops, palmtop computers, Internet access devices, organizers, global positioning system (GPS) receivers, or other similar devices. The mobile device 102 may include a user interface such as a display, keypad, or speaker. The user interface allows the user of the device to receive information and data from and to input information and data into the mobile device 102.

The mobile device 102 communicates with the remote server 108 over the wireless network system 104 and network connection 106. The wireless network system 104 may be any type of communications system that is capable of sending and receiving signals. The wireless network system 104 may operate according to the Global System for Mobile (GSM) standards that is capable of sending and receiving data packets using the General Packet Radio Service (GPRS) or using Wideband-Code Division Multiple Access (W-CDMA). The network connection 106 may be any type of connection capable of transmitting and receiving signals between a wireless network system 104 and a remote server 108. While not shown, mobile device 102 and remote server 108 may be connected using any number of wired or wireless methods. For example, the mobile device 102 and the remote server 108 may have a wireless connection such as a short range, wireless Bluetooth or IrDA connection.

The remote server 108 may be any type of computer system that is capable of sending and receiving signals to and from the mobile device 102. As disclosed herein, the mobile device 102 may download data from the remote server 108 via the wireless network system 104 and the network connection 106. The data may include instructional content that contains step-by-step instructions concerning how to complete a particular task. The remote server 108 may include the capability to store, search, and retrieve instructional content and to transmit that content to the mobile device 102 when instructed to do so. The instructional content may be new content that was not previously available on the mobile device 102, or it may be content that is designed to replace or update content that is currently stored on the mobile device 102.

The process for determining what instructional content should be downloaded from the remote server 108 to the mobile device 102 may be automated or it may be manual. The mobile device user may select and then download instructional content in a way that would be known to those skilled in the art. The mobile device user may also choose to delete certain instructional content on the mobile device 102. Instructional content may be downloaded periodically or whenever it is necessary to update the content on the mobile device 102. The amount of instructional content that may be stored on the mobile device 102 may be limited by the constraints of the device. It may be necessary at times to delete instructional content from the mobile device 102 to make space for new or revised content. The deletion process may be performed automatically by the mobile device 102 or it may be performed manually by the user.

The instructional content on the mobile device 102 may be delivered to and stored on the device in any number of ways that are known to those skilled in the art. For example, the instructional content may be hard-coded into the device, it may be loaded at the factory, or it may be downloaded from the remote server 108. The mobile device 102 may include a registry that may be used to store basic information concerning the instructional content on the device. The registry helps to increase performance by maintaining a readily accessible list of the instructional content currently available on the mobile device 102. As the instructional content on the device is added, updated, or deleted, the mobile device 102 maintains the registry to ensure that it is accurate and up to date.

The invention as described herein may be implemented in the mobile device 102 and the remote server 108 using application software that contains a series of instructions for the mobile device 102 and remote server 108 to perform particular tasks. The mobile device 102 and the remote server 108 in combination with the instructions form the means to carry out the invention.

Figure 2:
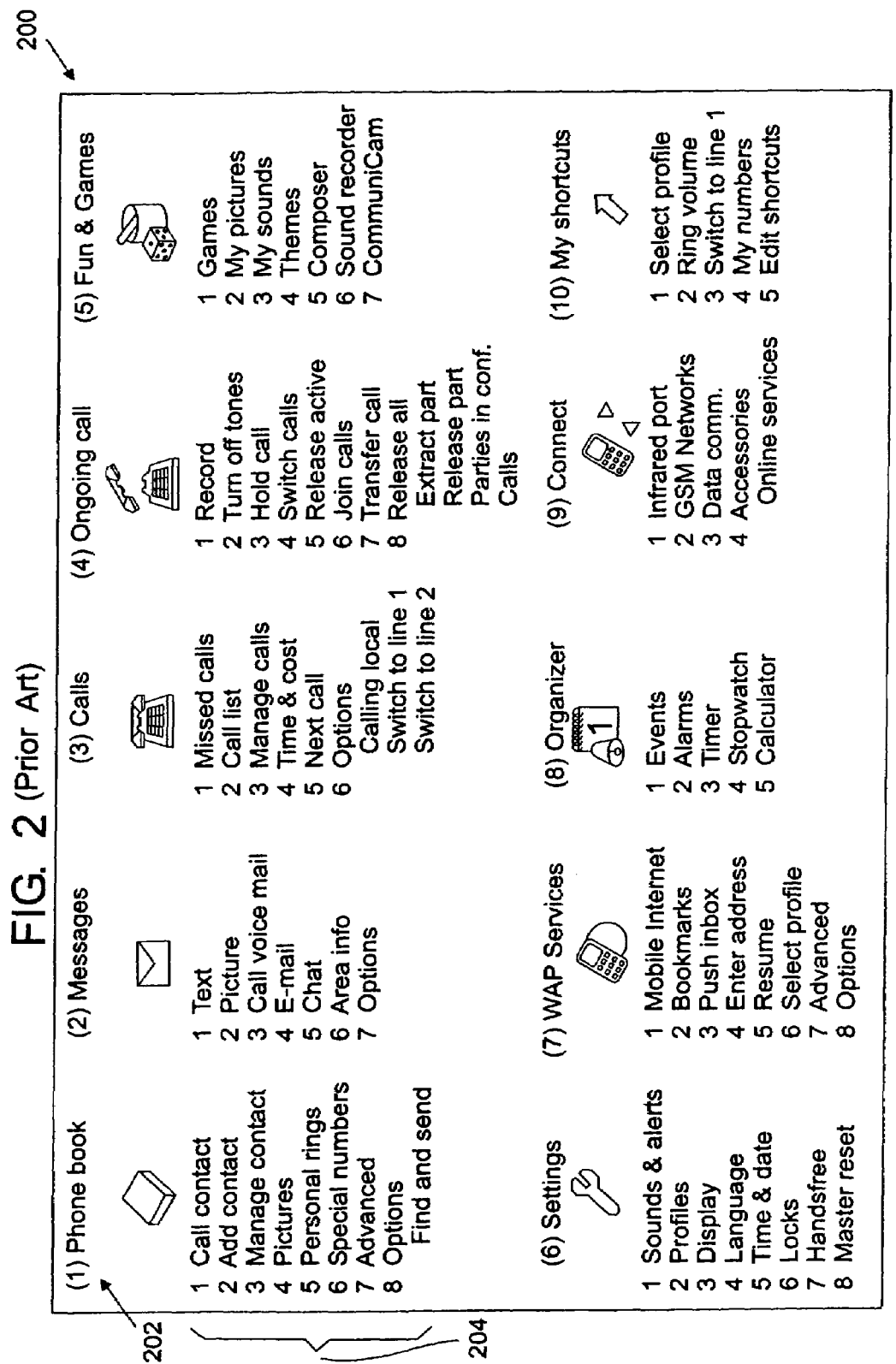
FIG. 2 is an example overview of a menu system available on a typical mobile device.

Mobile devices such as the one shown in FIG. 1 often have many features, functions, applications, options, and tools available to assist a user in using the device or to be used for other purposes. Many times these features are not used because either the user is unaware that the feature exists or the user simply does not know how to use it. On a mobile device, such as a cellular telephone, the features are typically organized into menus to assist the user in finding the particular feature, function, application, option, or tool for which he or she may be looking. FIG. 2 is an example overview of a menu system available on a mobile device. A menu system 200 may include menu headings 202 and menu subheadings 204. The menu headings 202 and menu subheadings 204 represent various features, functions, applications, options, and tools that are available on the mobile device. The user may select a feature such as the Phone book, and then select Add contact to add a contact to the phone book for future use. The user may also select Organizer and then Timer to set a timer. The mobile device will then alert the user when the timer expires.

As the menu system 200 demonstrates there are often many features available to the user of a mobile device. These features can often be complicated to use and may require the user to perform numerous steps to perform a given task. For example, to add a contact on a mobile device, such as a SonyEricsson T300, the user must: (1) scroll to Phone book, press YES, scroll to Add contact, press YES; (2) scroll to the field the user wants to fill in, press YES; (3) enter the information, press YES; (4) after the user has entered the information, scroll to Save and exit?, and press YES. To edit a contact on the mobile device, the user must: (1) scroll to Phone book, press YES, scroll to Manage contact, press YES, scroll to Edit contact, press YES; (2) enter the first letters of the contact, press YES; (3) after the contact is highlighted, press YES; (4) select Edit info, press YES; (5) scroll to the field the user wants to fill in, press YES; (6) enter the information, press YES; and (7) after the user has entered the information, scroll down to Save and exit?, and press YES.

The present invention breaks the instructional steps down and displays the steps for completing the task to the user one step at a time. As each step is performed, the user is provided with feedback to indicate when the step has been performed successfully. When an error or deviation from what is expected is detected, the user is immediately notified. By only displaying one step at a time, the amount of display space required to display the step on the mobile device is minimized. The instructional steps may also be presented to the user using text-to-speech technology, thereby requiring no display space at all. The text-to-speech technology would utilize the mobile device's speaker to interface with the user.

The mobile device may contain instructional content regarding a number of different topics. These instructional topics provide the user with step-by-step instructions designed to assist the user to accomplish a particular task. For example, how to add a contact to a phone book or how to edit a contact in a phone book. The instructional topics may include, but are not limited to, how to use many of the features, functions, applications, options, and tools available on the mobile device. However, the instructional content available on the mobile device may also include instructions regarding tasks that are not related to the use or operation of the mobile device. For example, how to change a car tire or how to program a microwave oven.

Figure 3A:
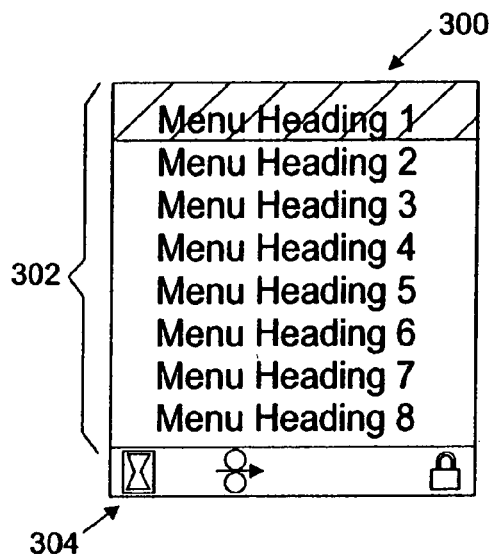
FIGS. 3A through 3D illustrate mobile device displays according to one embodiment of the present invention.

FIG. 3A illustrates a mobile device display according to one embodiment of the present invention. The display 300 contains a number of menu headings 302 (see FIG. 2) arranged in a vertically aligned list. The menu headings 302 are shown in FIG. 3A as Menu Heading 1 through 8. While the menu headings 302 are show in a text list, it would be easily understood by one skilled in the art that the menu headings 302 of the present invention may also be represented in other ways such as through the use of icons. The currently selected menu heading 302 is highlighted using a reverse video mode. Various icons and indicators 304 are shown along the bottom of the display 300. The icons and indicators 304 provide information regarding the current status of the mobile device or represent various processes or programs that are running on the mobile device.

Figure 3B:
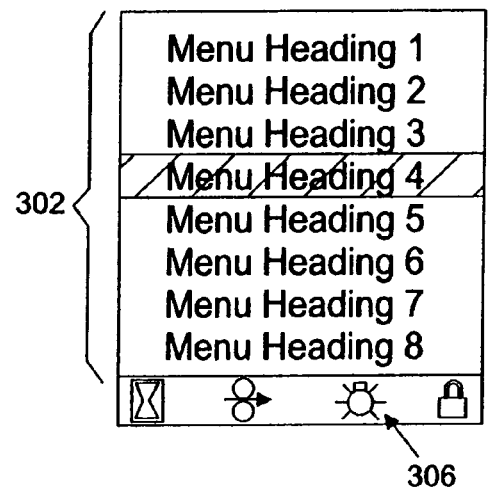

FIG. 3B illustrates a mobile device display according to another embodiment of the present invention. As the user scrolls down the menu headings 302, the mobile device may determine and then notify the user that an instructional topic exists for the currently selected menu heading 302. If an instructional topic exists on the mobile device for the currently selected menu heading, the mobile device may display a notification icon 306. If the notification icon 306 is not displayed, it would indicate that there is not an instructional topics for the currently selected menu heading 302 on the mobile device. If an instructional topic exists, the user may then use a device-specific mechanism such as pressing a particular button on the keypad or some other means that would be known to those skilled in the art to execute the instructional topic or display a list of instructional topics available for that menu heading 302.

Figure 4:
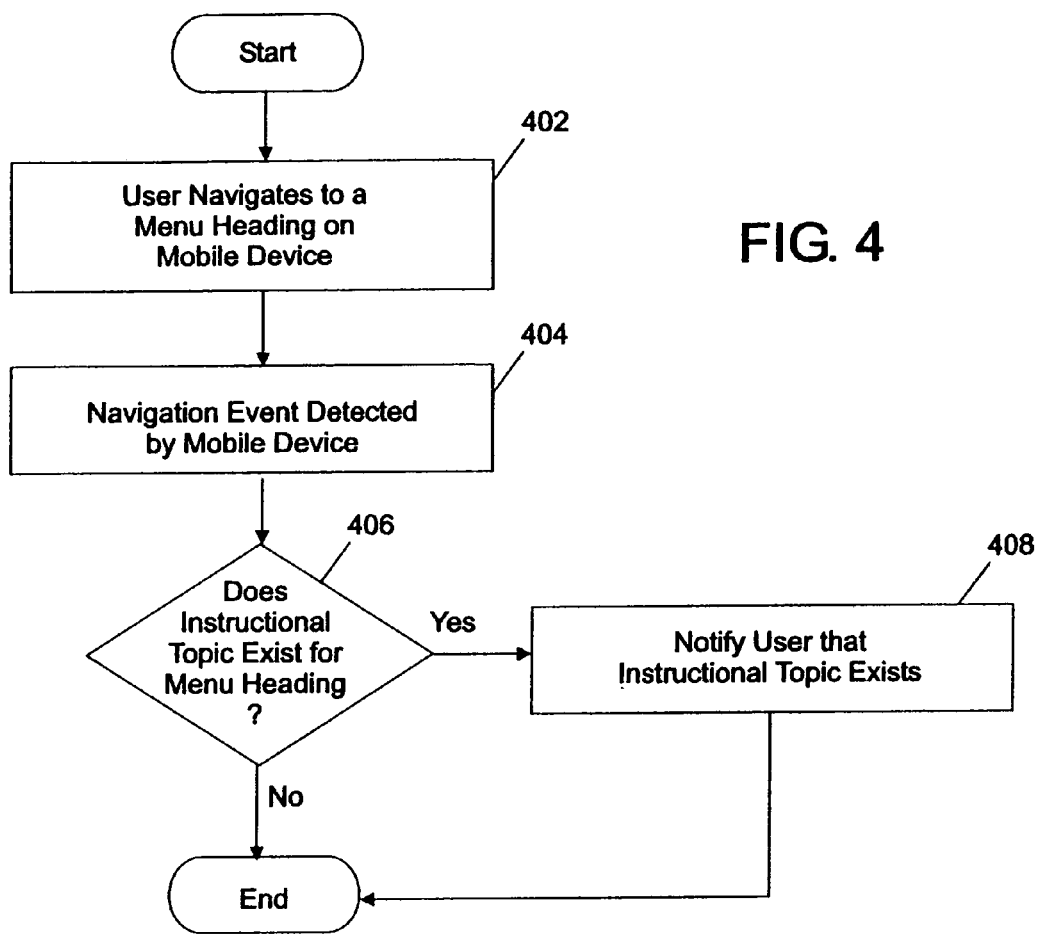
FIG. 4 is a flowchart diagram illustrating one embodiment of the mobile device process for performing the present invention.

FIG. 4 is a flowchart diagram illustrating one embodiment of the mobile device process for notifying the user of the availability of an instructional topic on the mobile device. The process begins at block 402 where the user navigates to a menu heading on the mobile device. The process continues at block 404 where a navigation event is detected by the mobile device. The navigation event may be generated by the user scrolling through the list of menu headings (see FIG. 3A) or by the user selecting a particular menu heading. Once a navigation event has been detected, the process continues to block 406 where the mobile device will determine if an instructional topic exists for the current menu heading. If an instructional topic exists for the menu heading, the mobile device will notify the user at block 408. The process will end if an instructional topic does not exist for the menu heading or after the user has been notified that an instructional topic exists for the menu heading.

Note that the present invention is not limited to the embodiment of the mobile device process for notifying the user of the availability of an instructional topic described above. The exact process may vary depending on the mobile device used. As one of ordinary skill in the telecommunications and computing arts would quickly recognize, the steps described above for the mobile device process may vary, be ordered differently, or involve additional steps not disclosed herein, and that the present invention is not limited to the above process.

Figure 3C:
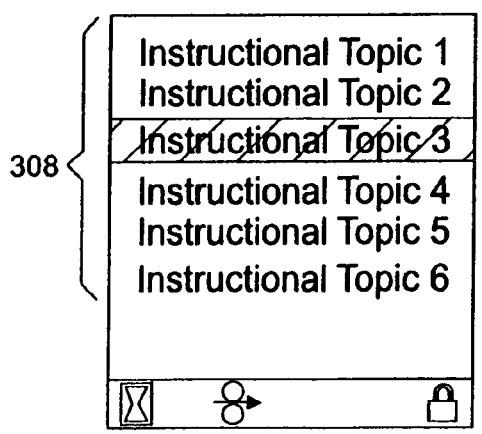

FIG. 3C illustrates a mobile device display according to another embodiment of the present invention. The user of a mobile device may elect to view a list of instructional topics by pressing a button on the keypad such as Help. A list of instructional topics 308 may be provided from which the user may select the particular topic of interest. The list of instructional topics 308 is generated based on various parameters. For example, the user may provide input that searches for topics on a particular subject. The list may be generated based on the information currently on the mobile device display or on the menus previously selected by the user. The list may also be generated based on the programs or applications that are currently running on the mobile device or on the instructional topics that are currently stored on the mobile device. Finally, the list of instructional topics 308 may also be generated based on the instructional topics that are stored on a remote server.

Figure 5:
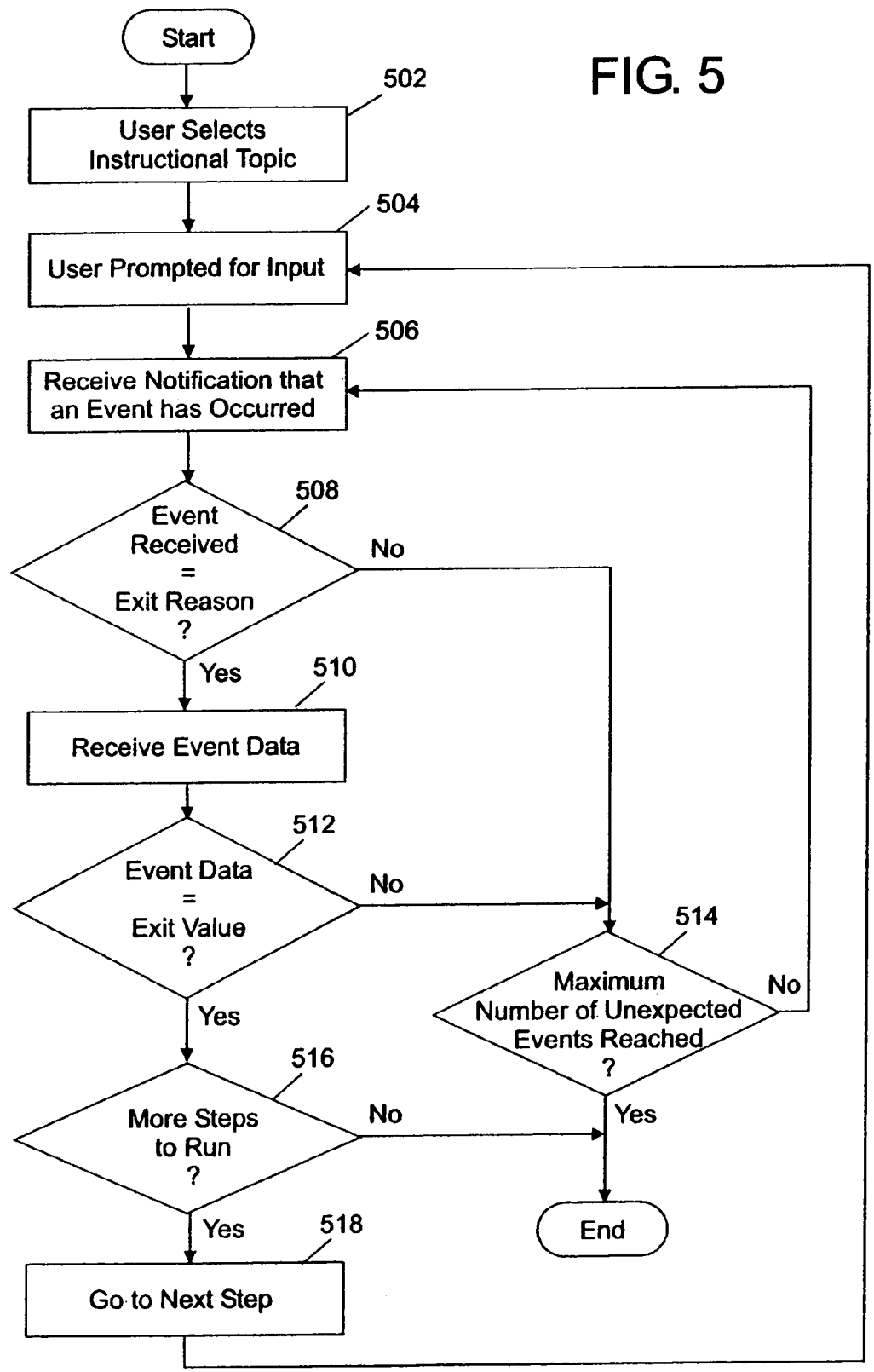
FIG. 5 is a flowchart diagram illustrating one embodiment of the mobile device process for performing the present invention.

FIG. 5 is a flowchart diagram illustrating one embodiment of the mobile device process for executing an instructional topic on the mobile device. The user of the mobile device selects an instructional topic for completing a particular task. After the instructional topic is selected, the steps to perform the task are executed and various actions are taken that are necessary to complete the task. The process beings at block 502 where the user selects an instructional topic. After an instructional topic is selected, the user is prompted for input at block 504. The user prompt may be any type of prompt that is capable of being perceived by the user, and the input may be any type of input that is possible to receive from the user given the user interfaces available on the mobile device. The process will continue at block 506 when a notification is received that an event occurred. The event may be any type of event typically initiated by a user or the mobile device. For example, it may be a user event such as a joystick movement or key being pressed. The event may also be internally generated by the mobile device such as a notification regarding the time of day or the expiration of a timer. The event may also be generated by a remote device in a manner that would be easily understood by one skilled in the art.

After an event has been received, the process will continue at block 508 where the mobile device compares the event received to the exit reason to determine if the event received corresponds to the exit reason. The exit reason may be any response that is expected to be generated and detected when the user is prompted for input according to block 504. For example, if the user prompt was "Press the 4 key", the exit reason would be the pressing of a key. If the event received was the movement of the joystick on the mobile device, that event may not correspond to the exit reason. If the event received corresponds to the exit reason, the process will continue to block 510 where event data is received. If the event received does not correspond to the exit reason, the process will continue to block 514 where the mobile device will determine if the maximum number of unexpected events has been reached.

After the event data has been received at block 510, the mobile device will compare the event data to the exit value to determine if the event data corresponds to the exit value at block 512. The exit value may be any value that may be generated by the event that corresponds to the exit reason. As discussed in the example in the proceeding paragraph, if the user prompt was "Press the 4 key" and the exit reason was that a key was pressed, the event data would be the identification of the key that was pressed and the exit value would be the 4 key. If the event data corresponds to the exit value, the process will continue at block 516 where the mobile device will determine if there are more steps to run. If there are more steps to run, the process will continue to block 518 to go to the next step and then proceed to block 504 to once again prompt the user for input. If there are no more steps to run at block 516, the process will end. If the event data does not correspond to the exit value at block 512, the process will continue to block 514 where the mobile device will determine if the maximum number of unexpected events has been reached.

If an unexpected event or event data has been received at block 508 or 512, the mobile device will determine if the maximum number of unexpected events has occurred. If the maximum number of unexpected events has been reached, the process will end. If the maximum number has not been reached, the process will return to block 506 to receive the next notification that an event has occurred. The mobile device may notify the user prior to returning to block 506 that the desired action has not been completed successfully. The maximum number of unexpected events that are allowed is a value that may be set by the user of the mobile device or it may be based on any number of other factors that may be considered or determined based on the technology available on the mobile device. If the steps corresponding to blocks 506, 508, 510, and 512 are completed successfully, the action for the current step being processed will be complete. If the process ends without the desired action being completed on a particular step, the user will be notified that the action has not been completed successfully.

As would be easily understood by one skilled in the art, there are many combinations of exit reasons and exit values that are possible with any given mobile device and these combinations may depend on the particular features, functions, applications, options, and tools that are available on the mobile device. The exit reasons and exit values may also depend on the user interfaces that are available on the mobile device. For example, the mobile device may or may not have a joystick. The mobile device may or may not have the capability to utilize text-to-speech technology that will enable the mobile device to prompt the user for input or speech-to-text technology that will enable the mobile device to accept input from the user in response to a vocal prompt. As was discussed previously, the mobile device may also internally generate the event. The exit reason may be that a timer event has occurred. The exit value may be that the timer has expired.

Note that the present invention is not limited to the embodiment of the mobile device process for executing an instructional topic described above. The exact process may vary depending on the mobile device used. As one of ordinary skill in the telecommunications and computing arts would quickly recognize, the steps described above for the mobile device process may vary, be ordered differently, or involve additional steps not disclosed herein, and that the present invention is not limited to the above process.

Figure 3D:
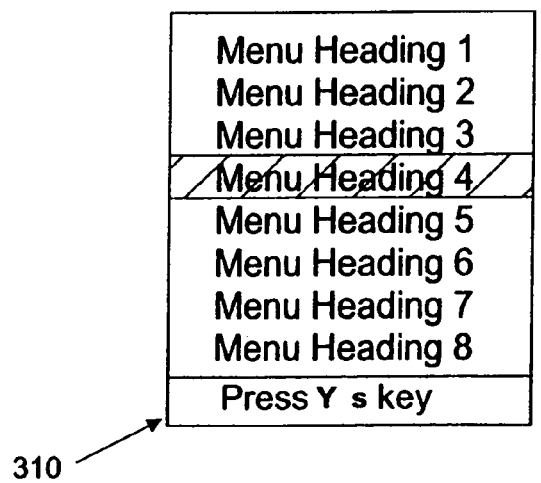

FIG. 3D illustrates a mobile device display according to another embodiment of the present invention. After the user selects an instructional topic in accordance with the process illustrated in FIG. 5, the user will be prompted for input as part of a step designed to assist the user to accomplish a particular task. FIG. 3D illustrates one embodiment of the present invention where the user prompt 310 is "Press YES key" in one area of the display while other information is displayed in another area of the display. In response to the user prompt 310, the user is expected to take an action that is necessary to complete the task, which in this example is to press the YES key. As was discussed in connection with FIG. 5, the exit reason would be a key being pressed and the exit value would be the YES key. After this step is complete, the next step in completing the task may be to enter information, press a different key, or scroll down a list given on the display. The goal is to assist the user to complete a task by substantially requiring the user to take various actions that are necessary to complete the task. The instructional topic selected by the user will determine the steps that will be presented to the user and the order in which those steps must be completed.

Figure 6:
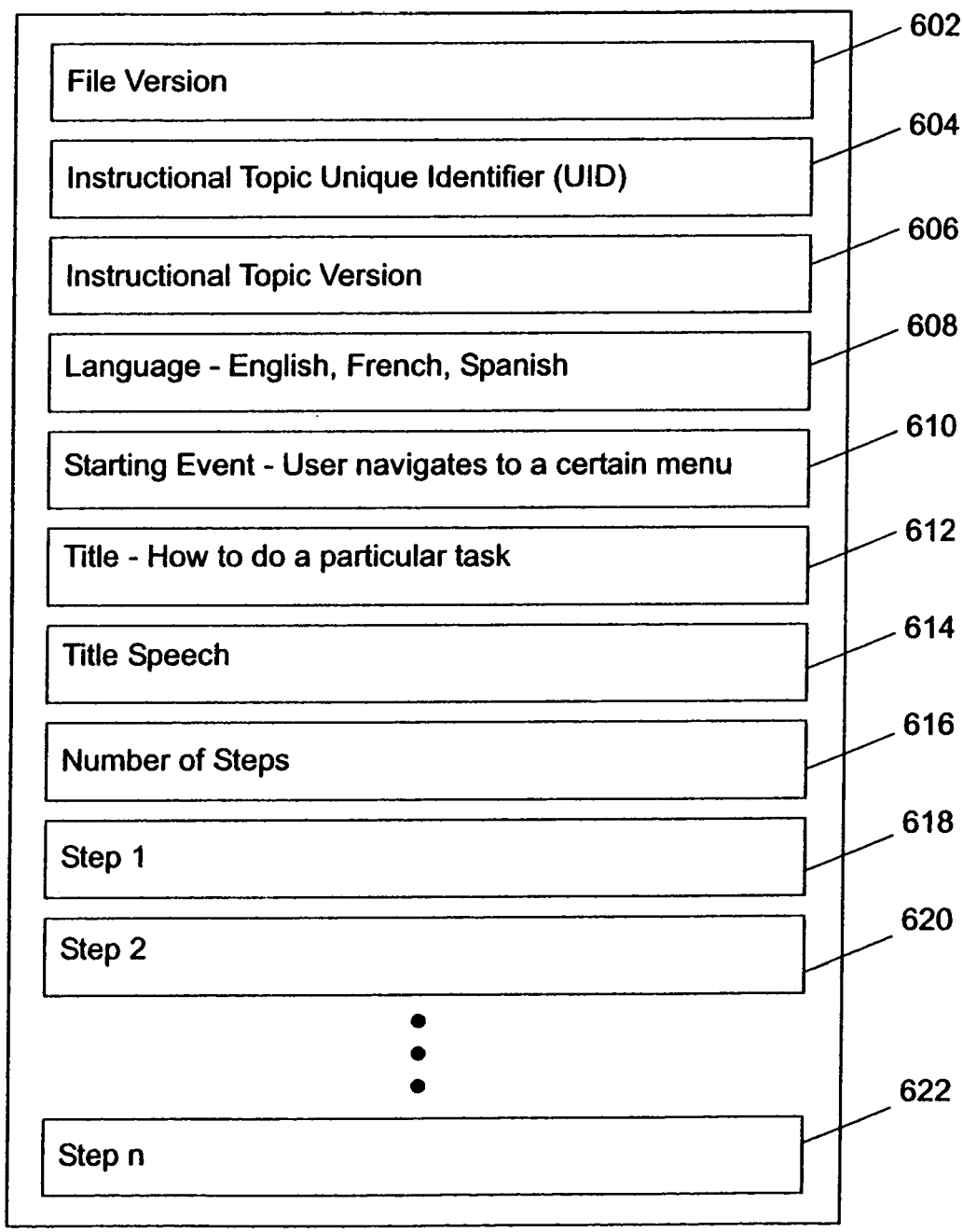
FIG. 6 illustrates the instructional topic file structure according to one embodiment of the present invention.

An instructional topic may be in the form of a file that contains information regarding the topic and the steps that must be performed. The file may be stored on the mobile device or it may be downloaded from a remote server as illustrated in FIG. 1. FIG. 6 illustrates the file structure for an instructional topic according to one embodiment of the present invention. File version 602 indicates the specific layout or format of the instructional topic file. Version information may be helpful as the mobile device executes the steps contained in the file. The software available on the mobile device may also be of such a version that it can only execute instructional topic files that are below a certain version number.

Instructional topic unique identifier 604 (UID) identifies each instructional topic in a unique way. Using a title alone may not be sufficient since the same title may be used for more than one instructional topic. The UID 604 should be a sufficiently large number (32-bit) that is assigned when the instructional topic is first created. The UID 604 is constructed using an algorithm that may include a mobile device manufacture identifier, a device identifier, or a randomly-generated number based on the current date and time. In this example, once determined, the UID 604 does not change for a particular instructional topic. If the instructional topic is ever changed, the UID 604 remains the same.

Instructional topic version 606 indicates the version of the instructional topic that the file contains. The instructional topic version 606 allows the mobile device to replace an older version of an instructional topic with a newer version. If the instructional topic changes, the instructional topic version 606 is increased while the UID 604 remains the same. Language 608 indicates the language in which the title and user prompts are stored. Starting event 610 indicates the starting location for the selected instructional topic. The starting event 610 helps the mobile device determine the menu heading upon which the instructional topic began. Title 612 is the title of the instructional topic. An example of a title 612 would be "Add a contact to the phonebook" or "Turn off keypad lock". Title speech 614 would be used by those mobile devices that can process text-to-speech information. The title speech 614 functions as a pronunciation aid to a text-to-speech processor. It contains phonetic pronunciations of the title 612 so that text-to-speech output is accurate and understandable. Number of steps 616 indicates how many steps are included in the instructional topic. Items 618, 620, and 622 provide the actual content of the steps and the actions that need to be accomplished.

Figure 7:
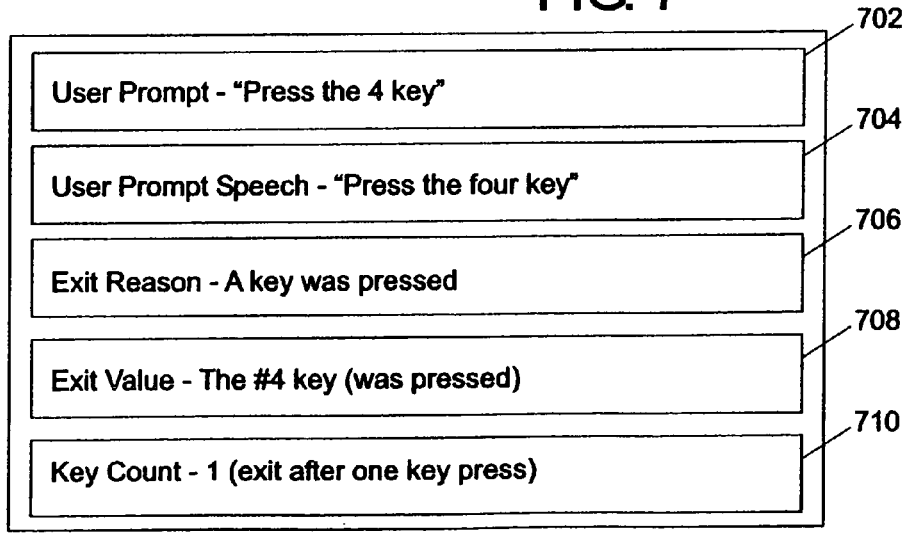
FIG. 7 illustrates the step contents according to one embodiment of the present invention.

FIG. 7 illustrates the step contents for an instructional topic according to one embodiment of the present invention. The steps in an instructional topic are shown in FIG. 6 as items 618, 620, and 622. FIG. 7 illustrates the content that may be utilized for each step. User prompt 702 represents the text that is displayed to the user to accomplish the step. For example, "Press the 5 key" or "Wait 10 seconds". The user prompt 702 may also be empty or blank. The user prompt 702 may be embellished with various text formatting such as bold, italic, and underline. User prompt speech 704 would be used by those mobile devices that can process text-to-speech information. The user prompt speech 704 functions as a pronunciation aid to a text-to-speech processor. It contains phonetic pronunciations of the user prompt 702 so that text-to-speech output is accurate and understandable. For example, if the user prompt 702 is "Press the # key", the user prompt speech 704 may be "Press the pound key" since a text-to-speech processor may not understand that the "#" symbol should be pronounced "pound". Exit reason 706 is the response that is expected to be generated and detected when the user is prompted by the user prompt 702. Exit value 708 may be any value that may be generated by a mobile device event that is generated in response to the user prompt 702 that corresponds to the exit reason 706. Key count 710 indicates how many key presses to receive before exiting the step when the exit reason 706 is "key press".

Figure 8:
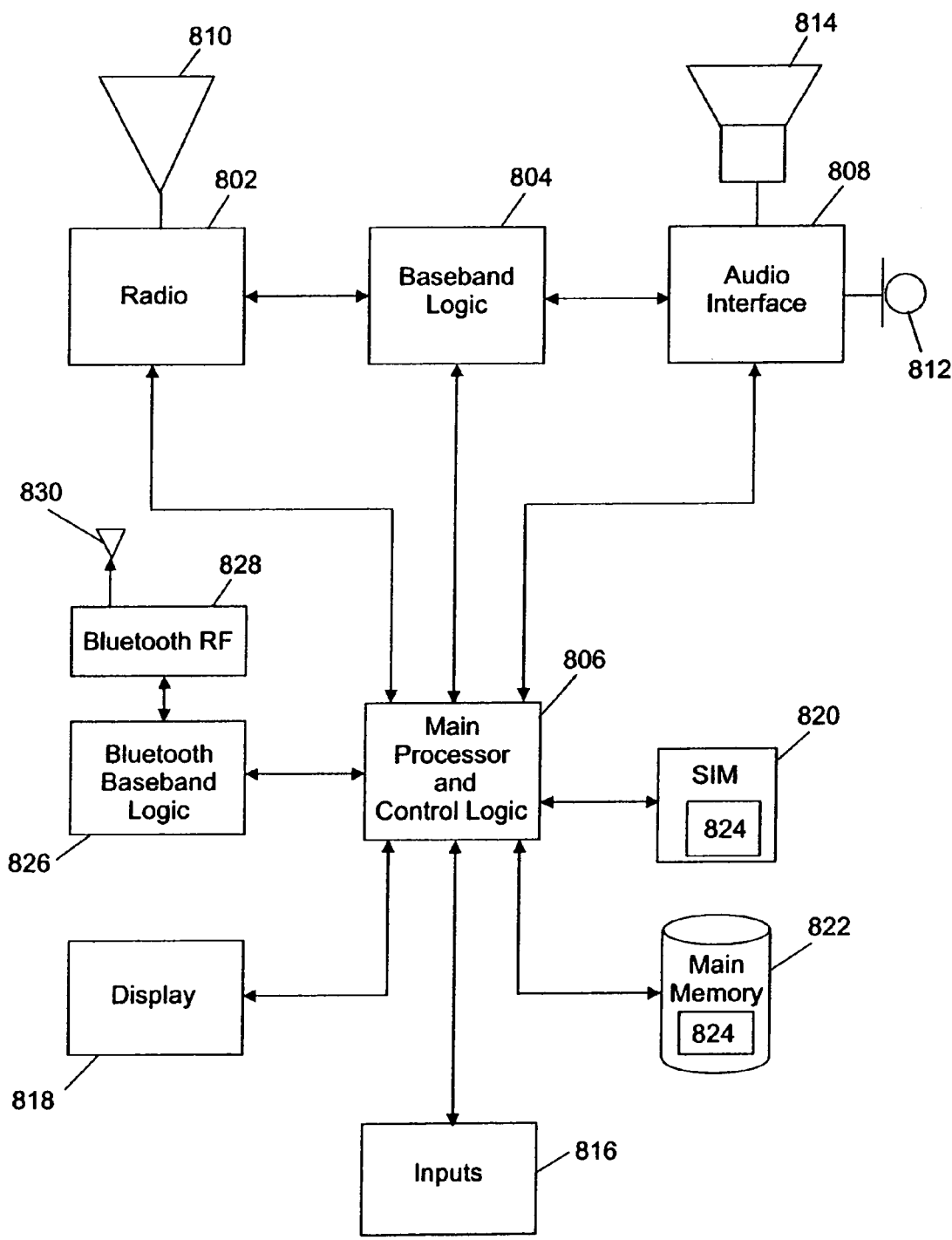
FIG. 8 is a block diagram of a mobile device programmed with application software to provide instructional content to the user of the mobile device according to one embodiment of the present invention.

FIG. 8 is a block diagram of a mobile device programmed with application software to provide instructional content to the user of the mobile device according to one embodiment of the present invention. The invention will work equally well with other types of communications devices that are capable of transmitting and receiving signals over a communications network.

As shown in FIG. 8, the mobile device includes a radio block, 802, a baseband logic block, 804, a main processor and control logic block, 806, and an audio interface block, 808. Within radio block 802, the information received and transmitted is converted from and to the radio frequencies (RF) of the various carrier types, and is filtered using baseband or intermediate frequency circuitry, as is understood in the art. The device's antenna system, 810, is connected to radio block 802. In baseband logic block 804, basic signal processing occurs, e.g., synchronization, channel coding, decoding, and burst formatting, as is understood in the art. Audio interface block 808 handles voice as well as analog-to-digital (A/D) and digital-to-analog (D/A) processing. It also receives input through microphone 812, and produces output through speaker 814.

The mobile device may include the ability to transmit and receive short range, wireless signals using the Bluetooth baseband logic block, 826, and the Bluetooth RF block, 828. Within the Bluetooth RF block 828, the information received and transmitted is converted from and to radio frequencies (RF) using Bluetooth standards, as is understood in the art. The short-range antenna, 830, is connected to the Bluetooth RF block 828. In Bluetooth baseband logic block 826, basic signal processing occurs, e.g., synchronization, channel coding, decoding, and burst formatting, as is understood in the art.

The main processor and control logic block 806 coordinates the aforementioned blocks and also plays an important role in controlling the inputs, 816, such as a keypad, and the display, 818, such as a liquid crystal display (LCD). The microphone 812, speaker 814, inputs 816, and display 818 that receive user input and provide information may be together or separately referred to herein as the "user interface" of the mobile device. The main processor and control logic block 806 also directs and controls the functions of the aforementioned transceiving blocks using one or more microprocessors or digital signal processors. A subscriber identity module (SIM), 820, may be included and is shown as operatively connected to the main processor and control logic block. Also included is the main memory 822. The application software and instructions, 824, necessary to implement the invention may be stored in SIM 820 or main memory, 822, and it controls the operation of the device through the main processor and control block 806. The processor and memory that controls the overall operation of the device may be together referred to herein as the "processing platform" of the mobile device. Some aspects of the invention are implemented in some embodiments by the application software controlling the hardware. The interconnection between the main processor, control logic, memory, and SIM are depicted schematically only for clarity, but is often an internal bus.

FIG. 8 does not show an optional GPS subsystem that the mobile device may use to fetch position information. Indeed, the invention can be implemented in a GPS receiver with two-way communication capability and no voice capability. In one embodiment, however, the invention is implemented in a mobile device like that of FIG. 8 with the addition of a GPS subsystem. GPS is well known to those skilled in the art. GPS is a space-based triangulation system using satellites and computers to measure positions anywhere on the earth. GPS was first developed by the United States Department of Defense as a navigational system. Compared to other land-based systems, GPS may be unlimited in its coverage, may provide continuous 24-hour coverage regardless of weather conditions, and is highly accurate. In the current implementation, a constellation of 24 satellites orbiting the earth continually emit a GPS radio frequency signal at a predetermined chip frequency. A GPS receiver receives the radio signals from the closest satellites and measures the time that the radio signals take to travel from the GPS satellites to the GPS receiver antenna. By multiplying the travel time by the speed of light, the GPS receiver can calculate a range for each satellite "in view." From additional information provided in the radio signal from the satellites, including the satellite's orbit and velocity and correlation to its onboard clock, the GPS processor can calculate the position of the GPS receiver through a process of triangulation.

A mobile device that implements an embodiment of the invention that also includes optional position information includes a complete GPS subsystem with appropriate switching between the conventional mobile device functions and GPS functions managed by the main processor and control logic block 806. Such a GPS subsystem includes a GPS RF section and GPS antenna and may include dedicated baseband and control logic. It is also possible that many of the GPS and mobile device functions share components, such as mixers and oscillators, and even an antenna, depending upon the frequency band in which the mobile device operates. In any case, the same main processor would normally control both mobile device and GPS functions.

Figure 9:
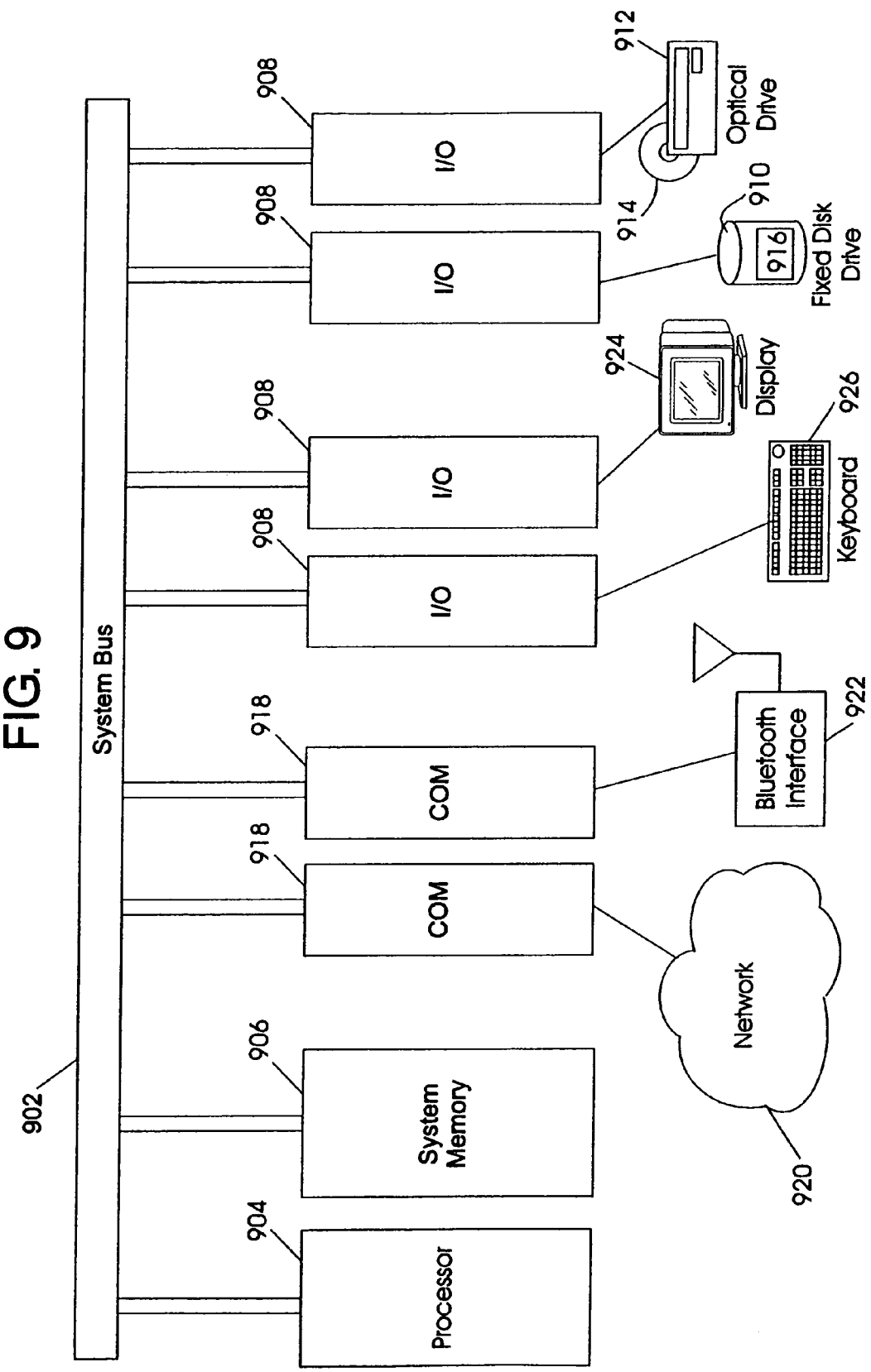
FIG. 9 illustrates a remote server in the form of a personal computer system programmed with application software to provide instructional content to the user of a mobile device according to one embodiment of the present invention.

FIG. 9 illustrates a remote server in the form of a personal computer system programmed with application software to provide instructional content to the user of a mobile device according to one embodiment of the present invention. System bus 902 interconnects the major components. The system is controlled by processor 904, which serves as the central processing unit (CPU) for the system. System memory 906 is typically divided into multiple types of memory or memory areas such as read-only memory (ROM), and random access memory (RAM). A plurality of standard input/output (I/O) adapters or devices, 908, are present. A typical system can have any number of such devices; only four are shown for clarity. These connect to various devices including a fixed disk drive, 910, and a removable media optical drive, 912. This drive accepts writable and read-only optical disks such as compact discs (CD's) and digital versatile discs (DVD's) as shown at 914.

The application software instructions for implementing various functions, 916, including the storing and transmission of instructional content, are stored on the fixed disc 910. When the system is operating, the instructions are partially loaded into memory 906 and executed by processor 904. The processor 904 and memory 906 that controls the overall operation of the device may be together referred to herein as the "processing platform" of the remote server. Some aspects of the invention are implemented in some embodiments by the application software controlling the hardware. Instructional content may be read and written to and from the fixed disc 910 or the optical disc 914 when inserted into the optical drive 912. The fixed disc 910 and the optical disc 914 may be used and referred to separately or together as a data repository for storing instructional topics on the remote server.

Additional I/O devices have specific functions. A personal computer system implementing all or a portion of the invention may contain I/O devices in the form of communications (COM) adapters, 918, to connect to a network, 920, or to a short range, wireless Bluetooth interface 922. The network or Bluetooth interface can be used to transfer software implementing the invention, or to transmit instructional content or instructional topics to the mobile device and may be referred to herein as the "network interface" of the remote server. A display, 924, is also connected, as well as a keyboard, 926. The keyboard 926 that receives user input may be referred to herein as the "user interface" of the remote server. Any of these adapters should be thought of as functional elements more so than discrete pieces of hardware. A personal computer system could have all or some of the adapter entities implemented on one circuit board.

It should be noted that the remote server of FIG. 9 is meant as an example only. Numerous types of general-purpose computer systems and other similar devices are available and can be used. Available systems may include those that run operating systems such as Windows™ by Microsoft, various versions of UNIX™, various versions of LINUX™, and various versions of Apple's Mac™ OS.

The application software elements of the invention may be embodied in hardware and/or in software (including firmware, resident software, micro-code, etc.). As shown above, the invention may take the form of application software, which may be embodied by a computer-usable or computer-readable storage medium having computer-usable or computer-readable, instructions or "code" embodied in the medium for use by or in connection with the device. Such mediums are pictured in FIG. 9 to represent the optical disc and the fixed disc. In the context of this document, a computer-usable or computer-readable medium may be any medium that can contain, store, communicate, propagate, or transport the software for use by or in connection with the apparatus or device. The computer-usable or computer-readable medium may be, for example but is not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the software is printed, as the software can be electronically captured, via, for instance, optical scanning of the paper or other medium, then compiled, interpreted, or otherwise processed in a suitable manner. The application software and the hardware described in FIG. 9 form the various means for carrying out the functions in some of the example embodiments.

Specific embodiments of an invention are described herein. One of ordinary skill in the telecommunications and computing arts will quickly recognize that the invention has other applications in other environments. In fact, many embodiments and implementations are possible. The following claims are in no way intended to limit the scope of the invention to the specific embodiments described above.

I claim:

1. A method of providing instructional content on a mobile device, the method comprising:
   providing a list of instructional topics from which a user may select at least one instructional topic;
   providing a notification that indicates whether the selected at least one instructional topic has associated instructional content stored on the mobile device; and
   executing at least one step of the instructional content based on the at least one instructional topic selected by the user when the selected at least one instructional topic has associated instructional content stored on the mobile device, the executing providing a feedback notification indicating whether the at least one step has not been performed successfully,
   wherein the at least one step is designed to assist the user to accomplish a particular task using the mobile device by substantially requiring the successful completion of at least one action that is necessary to complete the task.

2. The method of claim 1 wherein the list of instructional topics is provided to the user using a user interface device selected from a group consisting of a display, a speaker, and combinations thereof.

3. The method of claim 1 wherein providing the list of instructional topics comprises generating the list of instructional topics based on a mobile device parameter selected from a group consisting of user input, content displayed on the mobile device, menus selected by the user, programs running on the mobile device, instructional topics stored on the mobile device, and combinations thereof.

4. The method of claim 1 wherein the at least one instructional topic is stored on the mobile device.

5. The method of claim 4 further comprising maintaining a registry of instructional topics stored on the mobile device.

6. The method of claim 4 further comprising updating the at least one instructional topic stored on the mobile device using a remote server.

7. The method of claim 1 wherein the at least one instructional topic selected by the user is stored on a remote server.

8. The method of claim 7 further comprising transmitting and receiving the at least one instructional topic from the remote server to the mobile device.

9. The method of claim 1 wherein providing the list of instructional topics comprises generating the list of instructional topics based on the instructional topics stored on a remote server.

10. The method of claim 1 wherein the at least one action comprises:
    prompting the user for input;
    receiving a notification that an event has occurred;
    comparing the event received to an exit reason;
    receiving event data when the event received corresponds to the exit reason;
    comparing the event data to an exit value; and
    completing the at least one action when the event data substantially corresponds to the exit value.

11. An apparatus for providing instructional content, the apparatus comprising:
    means for providing a list of instructional topics from which a user may select at least one instructional topic;
    means for providing a notification that indicates whether the selected at least one instructional topic has associated instructional content stored on the mobile device; and
    means for executing at least one step of the instructional content based on the at least one instructional topic selected by the user when the selected at least one instructional topic has associated instructional content stored on the mobile device, the executing providing a feedback notification indicating whether the at least one step has been performed successfully,
    wherein the at least one step is designed to assist the user to accomplish a particular task using the apparatus by substantially requiring the successful completion of at least one action that is necessary to complete the task.

12. The apparatus of claim 11 wherein the list of instructional topics is provided to the user using a user interface device selected from a group consisting of a display, a speaker, and combinations thereof.

13. The apparatus of claim 11 further comprising means for displaying information related to the at least one step being executed in a first area of a display and other information in a second area of the display.

14. The apparatus of claim 11 further comprising means for providing information to the user through a speaker using a text-to-speech processor.

15. The apparatus of claim 11 wherein the means for providing the list of instructional topics comprises means for generating the list of instructional topics based on an apparatus parameter selected from a group consisting of user input, content displayed on the apparatus, menus selected by the user, programs running on the apparatus, instructional topics stored on the apparatus, and combinations thereof.

16. The apparatus of claim 11 wherein the at least one instructional topic is stored on the apparatus.

17. The apparatus of claim 16 further comprising means for maintaining a registry of instructional topics stored on the apparatus.

18. The apparatus of claim 16 further comprising means for updating the at least one instructional topic stored on the apparatus using a remote server.

19. The apparatus of claim 11 wherein the at least one instructional topic selected by the user is stored on a remote server.

20. The apparatus of claim 19 further comprising means for transmitting and receiving the at least one instructional topic from the remote server to the apparatus.

21. The apparatus of claim 11 wherein the means for providing the list of instructional topics comprises means for generating the list of instructional topics based on the instructional topics stored on a remote server.

22. The apparatus of claim 11 wherein the at least one instructional topic comprises an instructional topic file containing data selected from a group consisting of a file version, a unique identifier, an instructional topic version, a language, a starting event, a title, a title speech, a number of steps, step content, and combinations thereof.

23. The apparatus of claim 22 wherein the step content comprises data selected from a group consisting of a user prompt, a user prompt speech, an exit reason, an exit value, a key count, and combinations thereof.

24. The apparatus of claim 11 wherein the at least one action comprises:
    prompting the user for input;
    receiving a notification that an event has occurred;
    comparing the event received to an exit reason;
    receiving event data when the event received corresponds to the exit reason;
    comparing the event data to an exit value; and
    completing the at least one action when the event data substantially corresponds to the exit value.

25. A mobile device for providing instructional content, the mobile device comprising:
    a user interface operable to receive user input and provide information; and
    a processing platform operatively connected to the user interface operable, through the use of instructions, to enable the provision of a list of instructional topics from which a user may select at least one instructional topic, provide a notification that indicates whether the selected at least one instructional topic has associated instructional content stored on the mobile device, and execute at least one step of the instructional content based on the at least one instructional topic selected by the user when the selected at least one instructional topic has associated instructional content stored on the mobile device, the executing providing a feedback notification indicating whether the at least one step has not been performed successfully,
    wherein the at least one step is designed to assist the user to accomplish a particular task using the mobile device by substantially requiring the successful completion of at least one action that is necessary to complete the task.

26. The mobile device of claim 25 wherein the list of instructional topics is provided to the user using the user interface selected from a group consisting of a display, a speaker, and combinations thereof.

27. The mobile device of claim 25 wherein the provision of a list of instructional topics comprises generating the list of instructional topics based on a mobile device parameter selected from a group consisting of user input, content displayed on the mobile device, menus selected by the user, programs running on the mobile device, instructional topics stored on the mobile device, and combinations thereof.

28. The mobile device of claim 25 wherein the at least one instructional topic is stored on the mobile device.

29. The mobile device of claim 28 wherein the processing platform is further operable, through the use of instructions, to enable maintaining a registry of instructional topics stored on the mobile device.

30. The mobile device of claim 28 wherein the processing platform is further operable, through the use of instructions, to enable updating the at least one instructional topic stored on the mobile device using a remote server.

31. The mobile device of claim 25 wherein the at least one instructional topic selected by the user is stored on a remote server.

32. The mobile device of claim 31 wherein the processing platform is further operable, through the use of instructions, to enable transmitting and receiving the at least one instructional topic from the remote server to the mobile device.

33. The mobile device of claim 25 wherein the provision of a list of instructional topics comprises generating the list of instructional topics based on the instructional topics stored on a remote server.

34. The mobile device of claim 25 wherein the at least one instructional topic comprises an instructional topic file containing data selected from a group consisting of a file version, a unique identifier, an instructional topic version, a language, a starting event, a title, a title speech, a number of steps, step content, and combinations thereof.

35. The mobile device of claim 34 wherein the step content comprises data selected from a group consisting of a user prompt, a user prompt speech, an exit reason, an exit value, a key count, and combinations thereof.

36. The mobile device of claim 25 wherein the at least one action comprises:
    prompting the user for input;
    receiving a notification that an event has occurred;
    comparing the event received to an exit reason;
    receiving event data when the event received corresponds to the exit reason;
    comparing the event data to an exit value; and
    completing the at least one action when the event data substantially corresponds to the exit value.

37. A server for providing instructional content to a mobile device, the server comprising:
    a data repository operable to store instructional topics; and
    a network interface operable to communicate with the mobile device to provide the instructional topics to the mobile device,
    wherein the mobile device comprises:
        a user interface operable to receive user input and provide information; and
        a processing platform operatively connected to the user interface operable, through the use of instructions, to enable a user to select at least one instructional topic from the instructional topics, provide a notification that indicates whether the selected at least one instructional topic has associated instructional content stored on the mobile device, and execute at least one step of the instructional content based on the at least one instructional topic selected by the user when the selected at least one instructional topic has associated instructional content stored on the mobile device, the executing providing a feedback notification indicating whether the at least one step has not been performed successfully, wherein the at least one step is designed to assist the user to accomplish a particular task using the mobile device by substantially requiring the successful completion of at least one action that is necessary to complete the task.

* * * * *